COLOR-TELEVISION RECEIVING SYSTEM USING BEAM-INDEXING SIGNAL

Filed April 15, 1964

INVENTOR.
Noboru Usami
Takeo Aida
Sho Narita
Masanori Ogino
Kosuke Kitamura

BY

Mestern & Mestern

3,328,516
COLOR-TELEVISION RECEIVING SYSTEM USING BEAM-INDEXING SIGNAL

Noboru Usami, Hino-shi, Takeo Aida, Shinjuku-ku, Tokyo-to, Sho Narita, Kodaira-shi, Masanori Ogino, Kunitachi-machi, Kitatama-gun, Tokyo-to, and Kosuke Kitamura, Fuchu-shi, Japan, assignors to Kabushiki Kaisha Hitachi Seisakusho, Tokyo-to, Japan, a joint-stock company of Japan Filed Apr. 15, 1964, Ser. No. 359,927
Claims priority, application Japan, Apr. 18, 1963, 38/19,813
3 Claims. (Cl. 178—5.4)

Figure 1:
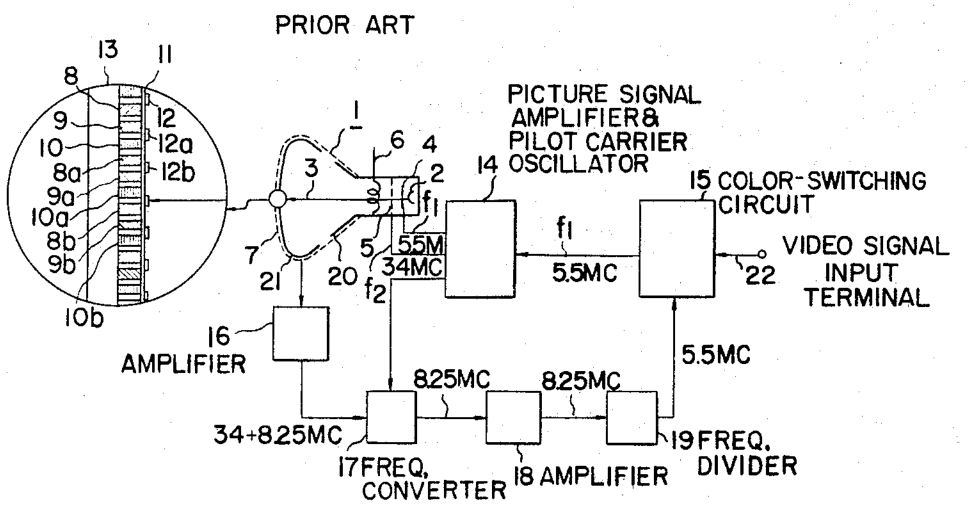
FIG. 1 PRIOR ART

This invention relates to color-television receiving systems of the type wherein a beam-indexing signal is used. More specifically, the invention concerns a new color-television receiving system of the above stated type affording excellent performance.

Generally stated, it is an object of the invention to overcome a certain difficulty hitherto encountered in the design of color-television receiving systems of the instant type and hitherto obstructing their reduction to practical products as will be described hereinafter.

It is a specific object to provide a color-television receiving system of the instant type wherein good color switching can be accomplished, and, moreover, disturbing effects such as color error due to variation in horizontal scanning speed are effectively reduced.

It is a further object to achieve the objects of the invention by means of a relatively simple circuit composition and arrangement.

Figure 2:
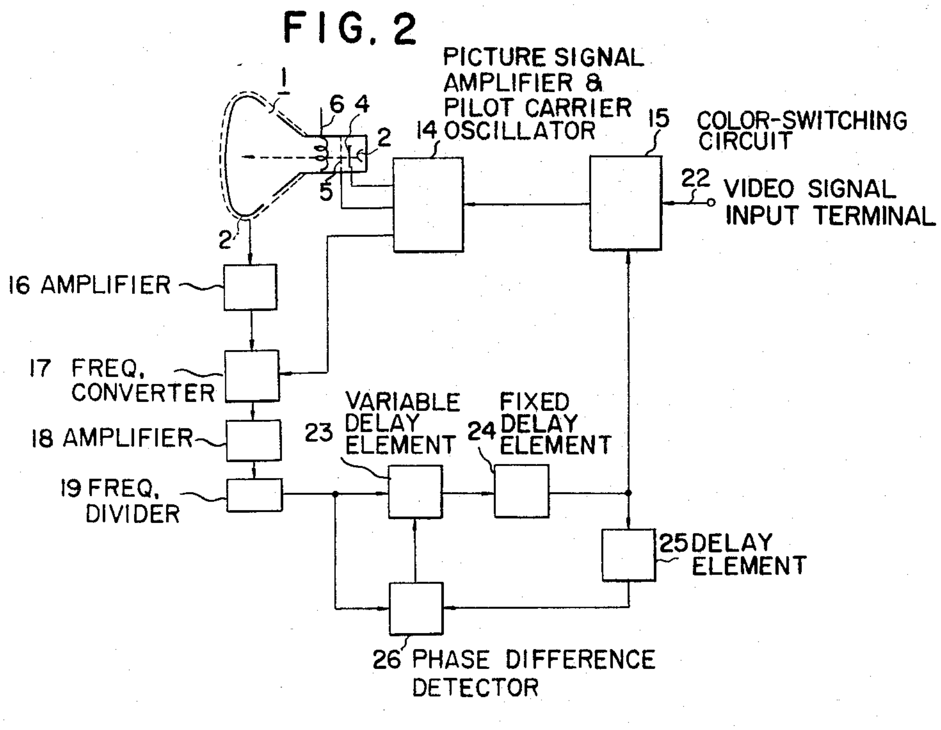

The foregoing objects have been achieved by the present invention, which, briefly described, resides in a novel circuit composition and arrangement for a color-television receiving system whereby the indexing signal delay time value produced in the total transmission route of the beam-indexing signal is controllably caused to be constantly equal to one horizontal scanning period, a whole-number multiple thereof, one vertical scanning period, or a whole-number multiple thereof. The nature, principle, and details of the invention will be best understood by reference to the following description, taken in conjunction with the accompanying drawing, in which like parts are designated by like reference characters, and in which:

FIGURE 1 is a block diagram indicating the essential composition of one example of a known color television receiving system of the instant type; and FIGURE 2 is a similar block diagram indicating the essential composition of a preferred embodiment of the color television receiving system according to the invention.

The following consideration of an example of a known color television receiving system is believed to be conducive to a full understanding of the nature and utility of the present invention.

One common example of a known color television receiving system of the indexing signal type, has a circuit arrangement as is indicated in FIGURE 1, and comprises, essentially, a cathode-ray tube 1, a combination 14 of a picture signal amplifier and a pilot carrier oscillator, a color-switching circuit 15, an amplifier 16 for amplifying modulated indexing signals, a frequency converter 17, an indexing signal amplifier 18, and a frequency divider 19. The cathode-ray tube 1 has a filament 2, a cathode 4, a grid 5 (which is a beam intensity controlling electrode) constituting an electron gun from which a single electron beam 3 is generated, a deflecting coil 6, an image screen 7, a glass tube housing 13, a secondary electron collector 20, a secondary electron emissive electrode 21 and a video input signal 22. As indicated in the enlarged sectional view (FIGURE 1) of a part of the image screen 7, the screen 7 is provided with red phosphor stripes 8, $8_a$, $8_b$ . . ., blue phosphor stripes 9, $9_a$, $9_b$ . . ., and green phosphor stripes 10, $10_a$, $10_b$ . . ., arranged in a regular manner in the form of thin painted coating stripes in a direction perpendicular to the horizontal scanning direction. The screen 7 is further provided with a light reflecting metal coating 11 and stripes 12, $12_a$, $12_b$ . . ., of a secondary electron emissive material arranged as successive, painted stripes with the same orientation and at equal intervals of space. In the example illustrated, three stripes of a secondary electron emissive material are arranged with respect to two phosphor triplets each consisting of one red, one blue, and one green phosphor stripe. When the screen 7 is scanned by the electron beam, the stripes of secondary electron emissive material 12, $12_a$, $12_b$ . . . emit secondary electrons, which are collected by the secondary electron collector 20 to generate from the secondary electron emissive electrode 21 a modulated indexing signal which is amplified by the aforementioned amplifier 16.

By way of illustration, the following consideration is presented with the supposition that the frequency $f_1$ of the chrominance signal obtained from the color-switching circuit 15 is 5.5 mc./sec. (approximately), and the pilot carrier frequency $f_2$ is 34 mc./sec. Under these conditions, the electron beam 3 of the cathode-ray tube 1 is density modulated at the cathode 4 by a picture signal of 5.5 mc./sec. and, at the same time, is density modulated at the grid 5 by the aforementioned pilot signal of 34 mc./sec. This electron beam 3 horizontally scans the aforementioned phosphor triplets at the rate of 5.5 mc./sec., whereupon each phosphor stripe gives forth light. At the same time, secondary electrons are emitted at a frequency of $5.5\times3/2=8.25$ mc./sec. from each stripe of the secondary electron emissive material. The signal component near this frequency is an indexing signal indicating the beam position. The said secondary electrons are collected by the secondary electron collector 20, hence a modulated indexing signal resulting from the amplitude modulation of the pilot carrier signal (34 mc./sec.) at the frequency (near 8.25 mc./sec.) of the indexing signal is extracted from the secondary electron emissive electrode 21, and in the side band amplifier 16, only the upper side band signal (34.0+8.25 mc./sec.) of this frequency is passed and amplified. The resulting output signal is then demodulated in the frequency converter 17 by the pilot carrier signal (34 mc./sec.), whereby an indexing signal of 8.25 mc./sec. is obtained. This signal is amplified by the amplifier 18 and then, in the frequency divider 19, its frequency is multiplied by 2/3, whereby the signal becomes an indexing signal of 5.5 mc./sec. to accomplish synchronous control of the color-switching circuit 15.

The above described system is arranged so that the frequency of the indexing signal indicating the position of the electron beam becomes 3/2 times the chrominance signal frequency $f_1$ (in general, as a fractional multiple). The reason for this is that the non-linear characteristics of the cathode-ray tube give rise to a beat signal (39.5 mc./sec.) due to the pilot carrier (34 mc./sec.) and the picture signal (5.5 mc./sec.) in the electron beam current, and when this beat signal frequency coincides with the frequency of the modulated indexing signal, it becomes impossible to separate and extract only the indexing signal. Therefore, in order to solve this problem, the system is so arranged in the above described manner that the ratio of the indexing signal frequency and the picture signal frequency becomes a fractional ratio.

However, there has been the following difficulty which may be illustrated by denoting by $\tau_g$ the period of time from the instant of detection of the indexing signal based on the aforementioned secondary electrons to the instant hen the primary electron beam controlled by this in-:xing signal again reaches the phosphor screen of the ıage screen, that is, the so-called group delay time of .e indexing signal transmission route. In the above de-:ribed receiving system, it has been unavoidable to con-ol the color-switching circuit by inferring the present ectron beam position from the information of the post ɔy $\tau_g$) beam position. For this reason it has been im-ɔssible to control the color-switching circuit during ap-:oximately the period of time $\tau_g$ (for example, 8 micro-:conds) immediately after the start of horizontal deflec-ɔn of the beam, and it has been impossible to obtain a ɔrrectly colored image.

Furthermore, in receiving systems of this type, there :ists, in general, a relationship among the color-switch-ıg frequency $\omega$, the phase characteristic $\theta(\omega)$ of the ansmission route, and the group delay time $\tau_g$, which :lationship can be expresed by: $-d\theta d\omega=\tau_g$. Accord-ıgly, even if the color switching circuit has been ad-ısted to work correctly at a certain constant color-switch-ıg frequency, variation in the color switching frequency ue to variation in the horizontal scanning speed will ause a phase error ($-d\theta=\tau_g d\omega$), as can be observed :om the above equation, from which a color error is aused. For example, even if color switching circuit has een adjusted to work correctly in the case of color-switch-ıg frequency=5.5 mc./sec. and $\tau_g=5$ $\mu$sec., a 2-percent ariation in the horizontal scanning speed (consequently, ıe color-switching frequency) gives rise to a phase error f approximately 200 degrees. As a result, there arises ıe adverse effect whereby, on the picture surface, the rimary colors and complementary colors appear approxi-ıately to have been exchanged. Consequently, in hitherto nown systems, it has been necessary to confine the value f $\tau_g \cdot d\omega$ to a small value within a certain allowable range. [owever, such a measure has been accompanied by tech-ical difficulties which have obstructed the reduction of ıese systems into practical use.

The above described problem has been solved by the resent invention, a detailed description of which follows ereinbelow, particularly with respect to a preferred mbodiment thereof.

It has been found that by selecting the aforementioned roup delay time $\tau_g$ of the indexing signal transmission oute to be substantially equal to one horizontal period that is, the time period from the start of one line to the tart of the next line), a whole-number multiple of the aid period, one vertical period, or a whole-number mul-.ple of the said vertical period, it is possible to obtain n operation which is substantially equivalent to that in ıe case wherein $\tau_g=0$, or wherein the group delay .me $\tau_g$ has a small value within a certain allowable range.

In a preferred embodiment of the invention as shown ı FIGURE 2, there are provided components designated y reference characters 1 through 22, inclusive, which are espectively the same as or equivalent to those designated y the same reference characters in FIGURE 1. As de-:ribed in connection with FIGURE 1, the modulated ıdexing signal detected from a secondary electron emis-ive electrode 21 passes through an amplifier 16, a fre-uency converter 17, an indexing signal amplifier 18, and frequency divider 19. The indexing signal so obtained ; passed through a variable delay element 23 and a xed delay element 24, thereby being delayed by a definite .me, and is then applied to a color-switching circuit 15.

The delay due to the delay element 23 (for example, f a delay time variable range of approximately 0.2 micro-econd or more) and due to the delay element 24 (for xample, of a delay time of approximately 60 microsec-nds) is so selected that the sum of the delay times due ɔ the two elements 23 and 24 will be approximately equal ɔ the difference obtained by subtracting the group delay .me $\tau_g'$ of the remainder of the circuit from one horizon-al period.

In other terms, this means that, by this circuit com-ɔsition and arrangement, the time interval from the instant of detection of the indexing signal due to the secondary electrons to the instant when a primary-electron beam which is color-switch-controlled by the said indexing signal reaches the phosphor screen, that is, the time required for transmission of the indexing signal in the aforementioned indexing signal transmission route (hereinafter referred to as the indexing signal delay time) is selected to be exactly equal to one horizontal period.

Since the delay element 24 produces a delay time which is much greater than those of other delay elements, the fluctuation of its delay time due to factors such as temperature is greater than those of other elements.

However, by selecting the aforementioned variable delay element 23 so that its variable time range is greater than that of the delay element 24 due to factors such as temperature, and by appropriately controlling the element 23 by means of controlling circuit to be described hereinafter, control is accomplished so that the indexing signal delay time of the circuit is always equal to one horizontal period, in spite of the fluctuation due to the element 24. (It is to be observed that it is also possible for the said element 24 to assume, additionally, the function of the element 23.)

More specifically, one portion of the output extracted through the delay element 24 is passed through a delay element 25 having a delay time approximately equal to a time close in value to the difference produced by subtracting, from the aforementioned indexing signal delay time, the delay time to be produced by the elements 23 and 24, that is, approximately equal to the group delay time in a conventional circuit. The output so obtained from the delay element 25 and an input to be applied to the delay element 23 are subjected to phase comparison by a phase difference detector 26. The output of this detector 26 is utilized to accomplish appropirate correction of the delay time to be produced by the variable delay element 23, thereby to cause the indexing signal delay time of this circuit to coincide with one horizontal period.

Thus, in the system according to the present invention, by maintaining the total delay time of the beam indexing signal at a value approximately equal to one horizontal period, a whole-number multiple thereof, one vertical period, or a whole-number multiple thereof, the operation is caused to be essentially equivalent to that in the case wherein $\tau_g=0$, or wherein the group delay time $\tau_g$ is of a small value within a certain allowable range.

Accordingly, in the system according to the present invention, relatively good color switching can be accomplished, and, moreover, even when the horizontal scanning speed varies, disturbing effects such as color error are effectively reduced to an extent whereby they have no adverse effect in practical use.

In the case when the linearity of the horizontal scanning speed is excellent, similar effective results can be obtained by using a variable phase element to constitute the variable delay time element 23.

It should be understood, of course, that the foregoing disclosure relates principally to only a preferred embodiment of the invention and that it is intended to cover all changes and modifications of the example of the invention herein chosen for the purposes of the disclosure, which do not constitute departures from the spirit and scope of the invention as set forth in the appended claims.

What we claim is:

1. A color-telvesion receiving system utilizing a beam-index type cathode-ray tube, which comprises: means for taking out a beam-indexing signal generated as an electron beam horizontally scans an image screen of the cathode-ray tube; means for sequentially switching video signals representing respective colors of an image to be reproduced, to modulate the intensity of the electron beam in accordance with an information of the beam-indexing signal; delay means inserted between said first and second means for delaying the indexing signal, a delay time of said delay means being selected at such a value that a total delay time from an instant of taking-out of the indexing signal to an instant when the electron beam modulated in accordance with this indexing signal again reaches the image screen is substantially equal to a value of a whole-number multiple, including one, of one horizontal period; and means for adjusting the delay time of said delay means to compensate variations of said total delay time.

2. The color-television receiving system utilizing a beam-index type cathode ray tube according to claim 1, wherein said adjusting means comprises a fixed delay element having a standard delay time and connected to an output of said delay means, a phase difference detector for comparing the phase difference between a signal to be applied to said delay means and an output signal of said fixed delay element, and controlling means for adjusting the delay time of said delay means under the control of said phase difference detector.

3. The color-television receiving system utilizing a beam-index type cathode-ray tube according to claim 2, wherein a delay time of said fixed delay element is selected at a value obtained by deducting the delay time of said delay means from said total delay time.

References Cited

UNITED STATES PATENTS

| | | | |
|---|---|---|---|
| 2,831,052 | 4/1958 | Boothroyd | 178—5.4 |
| 2,967,210 | 1/1961 | Kell | 178—5.4 |
| 3,013,224 | 12/1961 | King | 323—101 X |
| 3,204,024 | 8/1965 | Keizer | 178—5.4 |
| 3,207,945 | 9/1965 | Goodman | 178—5.4 |

DAVID G. REDINBAUGH, *Primary Examiner.*

J. A. O'BRIEN, J. H. SCOTT, *Assistant Examiners.*